United States Patent [19]

Eberly, Jr. et al.

[11] Patent Number: 4,513,090
[45] Date of Patent: Apr. 23, 1985

[54] CRYSTALLINE SILICA ZEOLITE-CONTAINING CATALYST

[75] Inventors: Paul E. Eberly, Jr.; William E. Winter, Jr., both of Baton Rouge, La.

[73] Assignee: Exxon Research and Engineering Co., Florham Park, N.J.

[21] Appl. No.: 281,860

[22] Filed: Jul. 9, 1981

[51] Int. Cl.³ .................... B01J 29/28; B01J 29/04
[52] U.S. Cl. ........................ 502/66; 502/71; 502/254; 502/258; 208/120
[58] Field of Search ............ 252/455 Z, 455 R; 208/120; 502/66, 71, 254, 258

[56] References Cited

U.S. PATENT DOCUMENTS

| | | | |
|---|---|---|---|
| 3,509,044 | 4/1970 | Adams et al. | 208/216 PP |
| 3,941,871 | 3/1976 | Dwyer et al. | |
| 4,061,724 | 12/1977 | Grose et al. | |
| 4,073,865 | 2/1978 | Flanigen et al. | 252/449 X |
| 4,151,121 | 4/1979 | Gladrow | 252/455 Z |
| 4,283,306 | 8/1981 | Herkes | 252/432 |
| 4,305,808 | 12/1981 | Bowes et al. | 208/111 |
| 4,309,275 | 1/1982 | Mulaskey | 208/109 |
| 4,362,653 | 12/1982 | Robinson | 252/455 R |
| 4,428,862 | 1/1984 | Ward et al. | 502/77 |

OTHER PUBLICATIONS

Abstract of Dutch patent application No. 80-01342.
"Silicalite" Journal Article Article, *Nature*, vol. 271, Feb. 9, 1978, pp. 512–516.

*Primary Examiner*—Carl F. Dees
*Attorney, Agent, or Firm*—Marthe L. Gibbons

[57] ABSTRACT

A catalyst is provided which comprises a crystalline silica zeolite, a hydrogenation component and a support. The catalyst may be a physical mixture of the zeolite and the supported hydrogenation component or a composite catalyst. Hydrocarbon hydroprocessing processes such as hydroconversion and hydrodesulfurization utilizing the catalyst are also provided. The catalyst is particularly suited for the simultaneous pour point reduction and hydrodesulfurization of hydrocarbonaceous oils.

9 Claims, No Drawings

CRYSTALLINE SILICA ZEOLITE-CONTAINING CATALYST

BACKGROUND OF THE INVENTION

1. Field of the Invention

This invention relates to a catalyst and its use in hydrocarbon hydroprocessing processes.

2. Description of the Prior Art

Hydroprocessing utilizing a catalyst comprising a hydrogenation component and a support to refine or convert hydrocarbons is well known. The term "hydroprocessing" is used herein to denote a process in which a hydrocarbonaceous chargestock is contacted with a catalyst in the presence of hydrogen and under selected conditions to remove heteroatoms, such as sulfur, nitrogen, oxygen and metallic contaminants such as nickel, vanadium and iron from the chargestock and/or to saturate hydrocarbons and/or olefinic hydrocarbons in the feedstock and/or to hydrocrack the chargestock. Hydroprocessing processes include hydroconversion, such as hydrocracking, including pour point reduction and hydrodewaxing; hydrodesulfurization; hydrodenitrogenation; hydrodemetallization, and the like.

U.S. Pat. No. 3,941,871 discloses crystalline metal organosilicates which are essentially free of Group IIIA metals and crystalline silicate resulting from the thermal decomposition of the metal organosilicates. The silicates may be combined with other materials for use as catalysts.

Dutch patent application No. 80-01342 discloses catalytic conversion, particularly production of aromatics from acyclic compounds or from hydrogen and carbon monoxide using a catalyst comprising "silicalite". The "silicalite" may be used as catalyst or as carrier, e.g., for Ni, Pt, Co—Mo or Zn—Cu.

SUMMARY OF THE INVENTION

In accordance with the invention there is provided, a catalyst comprising an effective amount of a crystalline silica zeolite having uniform pore diameters, a hydrogenation component and a nonzeolitic inorganic oxide support, said hydrogenation component being associated with said support.

In accordance with the invention, there is also provided a hydroprocessing process utilizing the above-stated catalyst.

DETAILED DESCRIPTION OF THE INVENTION

The Crystalline Silica Zeolite

The term "crystalline silica zeolite" is used herein to denote a crystalline form of silica having uniform pore diameters, in contrast to amorphous silica, i.e. silica gel. Suitable crystalline silica zeolite for use as component of the present invention includes silica zeolites having uniform pore diameters above about 5 angstroms. Although the crystalline silica zeolite comprises essentially silica in the rigid framework of the zeolite crystal, a minor amount of aluminum or alumina may be present as impurity within the channels or associated with the zeolite.

Preferably, the crystalline silica zeolite is a silica polymorph denominated "silicalite" by Union Carbide. "Silicalite" is described in the journal *Nature*, vol. 27, pages 512–516 (Feb. 9, 1968) and in U.S. Pat. No. 4,061,724, the entire contents of which are hereby incorporated by reference. The crystalline silica polymorph designated as "silicalite" is described as having a uniform pore diameter of about 6 angstroms and, after calcination in air at 600° C., a mean refractive index of $1.39 \pm 0.01$ and a specific gravity at 25° C. of $1.70 \pm 0.05$ g/cc. Silicalite is described as having no cation exchange properties, in contrast to aluminum-containing zeolite (see p. 513 of above mentioned *Nature* article). Large crystals of crystalline silica polymorph are described in Union Carbide's U.S. Pat. No. 4,073,865, the entire contents of which are hereby incorporated by reference. The crystalline silica zeolite can be used with the other catalytic components of the present invention as a physical mixture of (a) the silica zeolite and (b) the hydrogenation component associated with the support or the crystalline silica zeolite may be present in a composite catalyst composition with the other components.

Suitable amounts of crystalline silica zeolite, based on the total catalyst, whether present as physical admixture or as a composite composition, range from about 0.1 to 80 weight percent, preferably from about 5 to about 60 weight percent, more preferably from about 20 to about 60 weight percent.

The Hydrogenation Component

The hydrogenation component of the catalyst of the present invention may be any of the hydrogenation components generally used in hydroprocessing. Suitable hydrogenation components include Group VIB metal components and Group VIII metal components and mixtures thereof such as, for example, the elemental metal, metal oxide or metal sulfide of the Group VIB metals and the elemental metal, metal oxide and metal sulfide of the Group VIII metals and mixtures thereof. The Group VIII metal component can be a noble metal or a non-noble metal and mixtures thereof. Suitable Group VIII noble metal components include palladium, platinum, ruthenium, rhodium, osmium, iridium and mixtures thereof. Suitable Group VIII non-noble metals include iron, cobalt and nickel. The Periodic Table referred to herein is in accordance with the *Handbook of Chemistry and Physics* by Chemical Rubber Company, Cleveland, Ohio, 45th Edition, 1964. A preferred Group VIB component in the final catalyst is selected from the group consisting of molybdenum, molybdenum oxide, molybdenum sulfide, tungsten, tungsten oxide, tungsten sulfide and mixtures thereof and a preferred Group VIII metal component is selected from the group consisting of nickel, nickel oxide, nickel sulfide, cobalt, cobalt oxide, cobalt sulfide and mixtures thereof. The Group VIB metal component may suitably be present in the final catalyst in amounts ranging from about 2 to about 30 weight percent, calculated as the oxide, based on the total catalyst. The group VIII metal component may suitably be present in amounts ranging from about 0.1 to about 10 weight percent, calculated as the oxide, based on the total catalyst.

The hydrogenation component may be composited with the support in any suitable manner and at any state of the preparation of the catalyst. For example, salts of the desired metals may be used to impregnate the support. The incipient wetness technique is one example of impregnation. Components such as, for example, those of Groups VIB and VIII may be cogelled or coprecipitated with the support, for example, alumina. When impregnation is used to associate the hydrogenation component and the support, the metals may be incorporated simultaneously or sequentially with or without intermediate drying or calcination. Another method of compositing the hydrogenation component and the support is to deposit the metals on the support, for example, by vapor phase deposition.

The Support

The support suitable for use in the catalyst of the present invention may be any of the supports known to be suitable for hydroprocessing catalysts. The support may be acidic or non-acidic, depending on the desired level of cracking. Suitable supports include non-zeolitic inorganic oxides such as alumina, amorphous silica, amorphous silica-alumina, magnesia, zirconia, boria, titania and mixtures thereof. Preferably the support is a non-zeolitic inorganic oxide. More preferably, the support is an alumina-containing gel which may additionally comprise amorphous silica. The desired amount of amorphous silica in the alumina-containing support will depend on the end usage. For hydrodesulfurization, the preferred inorganic oxides are alumina-containing support which may additionally comprise from about 1 to about 6 weight percent amorphous silica, based on the support. Such catalytic supports which additionally comprise a hydrogenation component may be prepared as described in U.S. Pat. No. 3,509,044, the teachings of which are hereby incorporated by reference. When the catalyst is used as a hydrocracking catalyst then from about 1 to about 90 weight percent amorphous silica, based on an alumina-containing support is suitable.

A preferred catalyst of the present invention comprises from about 5 to about 60 weight percent crystalline silica zeolite, from about 2 to about 30 weight percent Group VIB metal component, calculated as the oxide, based on the total catalyst, from about 0.1 to about 10 weight percent Group VIII non-noble metal component, calculated as the oxide, based on the total catalyst, the remainder being the alumina-containing support, all said weights being based on the total catalyst.

The catalyst of the present invention may be formed in any desired shape such as sieves, pellets, pills, cake, extrudates, powders, granules, etc. Furthermore, the crystalline silica may be in the form of separate particles that are used in physical admixture with particles of a supported hydrogenation component or the crystalline silica may be in a composite particle, for example, associated with the support. If desired, additional catalytic components may be composited with the catalyst by association with the composite catalyst or by association with any of the components. For example, a metal component of Groups II to VIII of the Periodic Table of Elements, such as palladium, platinum, nickel, cobalt, molybdenum, rhenium and mixtures thereof may be used as additional catalytic components. The additional metal component may be deposited on the silica zeolite, which may then be used as a separate particle in combination with particles of supported hydrogenation component or the silica zeolite with the metal deposited thereon may be dispersed in the hydrogenation-containing support of the composite catalyst.

The catalyst of the present invention is suitable for hydrocarbon hydroprocessing such as hydrodesulfurization, hydroconversion, hydrodenitrogenation. It is particularly suited for the simultaneous hydrodesulfurization and hydroconversion (e.g. pour point reduction) of heavy hydrocarbonaceous oils.

Operating Conditions

The operating conditions to be employed in the practice of the present invention are well known and vary with the particular hydroprocess reaction desired. Generally, temperatures ranging from about 400° to about 950° F. and pressures ranging from about 50 to about 3000 psig are suitable.

For simultaneous hydrodesulfurization and pour point reduction (e.g. selective hydrocracking) suitable operating conditions range from about 400° to about 950° F., preferably from about 500° to about 850° F., more preferably from about 650° to about 800° F. and a total pressure ranging from about 50 to 3000 psig, preferably from about 200 to about 300 psig, more preferably from about 400 to about 2000 psig at a hydrogen rate of about 300 to 10,000, preferably from about 1,000 to about 5,000, standard cubic feet per barrel of oil feed.

Heavy Hydrocarbonaceous Chargestock

Suitable chargestocks for the process of the present invention include hydrocarbonaceous oils boiling above about 290° F., preferably above about 350° F., more preferably above about 650° F. at atmospheric pressure, such as, for example, petroleum distillate fractions; petroleum crude oils, including heavy crude oils; heavy hydrocarbon distillates boiling in the range of about 650° to 1050° F. at atmospheric pressure, such as gas oils; residual petroleum oils such as atmospheric and vacuum distillation bottoms; bitumen; tar; tar sand oil; shale oil; liquids derived from coal liquefaction processes, including coal liquefaction bottoms. If desired when a relatively high sulfur-containing feed is utilized, the feed may be subjected to a conventional hydrorefining stage to decrease its sulfur content prior to subjecting the feed to the hydroprocessing of the present invention.

PREFERRED EMBODIMENTS

The following examples are presented to illustrate the invention.

EXAMPLE 1

Comparative hydroconversion experiments were conducted at a temperature of 760° F., a pressure of 2000 psig, a space velocity of about 0.3 V/HR/V with a hydrogen rate of 4000 standard cubic feet per barrel. The same feed (No. 1) was used in all these experiments, namely, a heavy Arabian atmospheric residuum having an atmospheric pressure boiling point above 650° F. and comprising 56 weight percent of material boiling above 1050° F. The feed had a sulfur content of 4.5 weight percent; a nitrogen content of 0.280 weight percent; 30 wppm Ni; 99 wppm V, and an asphaltene content of 12.2 weight percent.

The compositions of the catalysts used in this example and subsequent examples are shown in Table I.

TABLE I

| CATALYST | A | B | C | D | E |
|---|---|---|---|---|---|
| CoO | 3.9 | 3.1 | 3.1 | 3.1 | 1.6 |
| MoO$_3$ | 11.5 | 9.2 | 9.2 | 9.2 | 4.6 |
| Al$_2$O$_3$ | 83.6 | 66.9 | 67.4 | 67.5 | 33.5 |
| Amorphous SiO$_2$ | 1.0 | 0.8 | 0.8 | 0.8 | 0.3 |
| Silica Zeolite | 0 | 0 | 19.4 | 19.4 | 60.0 |
| Zeolite Y | 0 | 19.9 | 0 | 0 | 0 |
| PdO | 0 | 0.1 | 0.1 | 0 | 0 |

Catalyst A is a known hydrodesulfurization catalyst; catalyst B comprised a combination of the hydrodesulfurization catalyst designated "catalyst A" plus 20% of a known hydrocracking catalyst; catalyst C comprised the hydrodesulfurization catalyst designated "catalyst A" plus 20 weight percent of a crystalline silica zeolite on which was deposited palladium. Catalyst C is a catalyst in accordance with the present invention.

Catalyst D comprised a combination of the catalyst designated "catalyst A" plus 20% of crystalline silica zeolite. Catalyst D is a catalyst in accordance with the present invention. Catalyst E comprised a combination of the catalyst designated "catalyst A" and 60 wt. % of a crystalline silica zeolite.

The silica zeolite used was a "silicalite" having the following characteristics: a pore volume of 0.19 cc/gm, a crystal density of 1.76 gm/cc.

The results of these experiments are summarized in Table II.

TABLE II

Hydroprocessing of Heavy Arabian Atmospheric Residuum at 760° F., 2000 psig. 0.3 V/HR/V and 4000 SCF/B

|  | Catalyst A | Catalyst B | Catalyst C |
|---|---|---|---|
| Wt. % Removal |  |  |  |
| Sulfur | 83 | 87 | 79 |
| Nitrogen | 33 | 38 | 24 |
| Metals Ni + V | 99 | 99 | 97 |
| Asphaltenes | 81 | 81 | 80 |
| Pour Point of 1050° F.-portion of product | 85 | 95 | 30 |
| Wt. % on Feed |  |  |  |
| $C_1$-$C_4$ | 2.5 | 2.8 | 4.5 |
| $C_5$-430° F. | 3.0 | 2.8 | 9.0 |
| 430-650° F. | 12.8 | 11.6 | 11.2 |
| 650-1050° F. | 56.4 | 56.0 | 45.9 |
| 1050° F.+ | 25.3 | 26.8 | 29.4 |

NOTE
that all boiling points referred to herein are atmospheric pressure boiling points unless otherwise specified.

The weight percent removal values in Table II were calculated from the formula:

$$\text{Wt. \% Removal} = \left(\frac{\text{Wt. \% in feed} - \text{Wt. \% in product}}{\text{Wt. \% in Feed}}\right) \times 100$$

As can be seen from Table II, catalyst C, which is a catalyst of the present invention, gave a product having the lowest pour point (i.e. 30° F.) relative to catalysts A and B. Furthermore, there is increased yield of total $C_5$ to 650° F. gasoline range and jet fuel range components. Catalyst C had the best ability to crack and reduce the pour point of the 650° F. to 1050° F.+ portion of the feed. It should be noted that this desirable increase in cracking activity was accomplished by only a small loss in the ability to remove sulfur and metals.

EXAMPLE 2

Comparative hydroprocessing experiments were performed utilizing feeds No. 2 and 3 shown in Table III.

TABLE III

| FEED | NO. 2 | NO. 3 |
|---|---|---|
| Pour Point | 100 | 103 |
| API Gravity, at 60° F. | 30.4 | 20.7 |
| Wt. % S | 0.332 | 2.32 |
| Wt. % N | 0.036 | 0.089 |
| Wt. % C | 86.27 | 85.24 |
| Wt. % H | 13.36 | 12.35 |
| C/H Wt. Ratio | 6.457 | 6.902 |
| Distillation, °F. |  |  |
| IBP/5 | 729/739 | 585/727 |
| 10/20 | 756/784 | 772/816 |
| 30/40 | 808/829 | 846/872 |
| 50/60 | 855/880 | 899/925 |
| 70/80 | 914/943 | 951/978 |
| 90/95 | 981/1004 | 1013/1037 |
| FBP | 1020 | 1050 |

Feedstock No. 2, which was a hydrotreated vacuum gas oil having a sulfur content of 0.33 weight percent, was hydroprocessed at 720° F., 1300 psig, 0.6 V/HR/V and a gas treat rate of 4500 standard cubic feet per barrel of oil using catalysts A, C, D and E. The results are shown in Table IV.

TABLE IV

HYDROPROCESSING OF A LOW SULFUR VACUUM GAS OIL (FEEDSTOCK NO. 2) AT 720° F., 1300 PSIG, 0.6 V/HR/V AND 4500 SCF/B

| Wt. % Removal | CATALYST A | CATALYST E | CATALYST D | CATALYST C |
|---|---|---|---|---|
| Sulfur | 99.7 | 99.1 | 98.5 | 97.9 |
| Nitrogen | 97.2 | 93.9 | 97.0 | 97.0 |
| Pour Point, °F. | 95 | 58 | 60 | −4 |

As can be seen from the data in Table IV, catalysts C, D and E, which are catalysts in accordance with the present invention, gave a lower pour point than catalyst A which is a prior art catalyst.

Two other series of experiments were performed with a feedstock designated herein feedstock No. 3, which was a vacuum gas oil which had not been hydrotreated and which contained a sulfur content of 2.32 weight percent. One series of these experiments was performed at a temperature of about 720° F. and the other series at a temperature of about 740° F. The results of the series of experiments conducted at 720° F., 1300 psig, 0.6 V/HR/V and 4500 SCF/B gas rate are given in Table V.

TABLE V

HYDROPROCESSING OF A LOW SULFUR VACUUM GAS OIL (FEEDSTOCK NO. 3) AT 720° F., 1300 PSIG, 0.6 V/HR/V AND 4500 SCF/B

| Wt. % Removal | CATALYST A | CATALYST E | CATALYST D | CATALYST C |
|---|---|---|---|---|
| Sulfur | 99.1 | 92.4 | 98.2 | 97.8 |
| Nitrogen | 78.3 | 36.4 | 70.4 | 64.2 |
| Pour Point, °F. | 90 | 72 | 72 | 48 |

The results of the experiments performed at 740° F., 1300 psig, 0.6 V/HR/V and 4500 SCF/B gas rate are given in Table VI.

TABLE VI

HYDROPROCESSING OF A HIGH SULFUR VACUUM GAS OIL (FEEDSTOCK NO. 3) AT 740° F., 1300 PSIG, 0.6 V/HR/V AND 4500 SCF/B

| Wt. % Removal | CATALYST A | CATALYST E | CATALYST D | CATALYST C |
|---|---|---|---|---|
| Sulfur | 99.7 | 97.4 | 97.6 | 98.9 |

TABLE VI-continued
HYDROPROCESSING OF A HIGH SULFUR
VACUUM GAS OIL (FEEDSTOCK NO. 3) AT 740° F.,
1300 PSIG, 0.6 V/HR/V AND 4500 SCF/B

| Wt. % Removal | CATALYST A | CATALYST E | CATALYST D | CATALYST C |
|---|---|---|---|---|
| Nitrogen | 92.9 | 62.9 | 81.0 | 79.9 |
| Pour Point, °F. | 90 | 20 | 70 | 20 |

Catalysts C, D and E which are catalysts of the present invention, gave greater pour point reduction than catalyst A in the 720° F. experiments and in the 740° F. experiments.

As can be seen from Table VI, at 740° F., catalyst E which contained 60% silica zeolite gave the same pour point reduction as catalyst C.

What is claimed is:

1. A catalyst comprising a physical mixture of particles of (a) a crystalline silica zeolite having uniform pore diameters, and (b) a hydrogenation component composited with a non-zeolitic alumina-containing support comprising from about 1 to about 6 weight percent amorphous silica, based on the weight of said support.

2. The catalyst of claim 1 wherein said hydrogenation component is selected from the group consisting of Group VIB metal components, Group VIII metal components and mixtures thereof.

3. The catalyst of claim 1 wherein said hydrogenation component comprises a noble metal component of Group VIII selected from the group consisting of palladium, platinum, ruthenium, rhodium, osmium, iridium and mixtures thereof.

4. The catalyst of claim 1 wherein said hydrogenation component comprises a non-noble metal component of Group VIII selected from the group consisting of iron, cobalt and nickel.

5. The catalyst of claim 1 wherein said hydrogenation component is selected from the group consisting of nickel, nickel oxide, nickel sulfide, molybdenum, molybdenum oxide, molybdenum sulfide, cobalt, cobalt oxide, cobalt sulfide, tungsten, tungsten oxide, tungsten sulfide and mixtures thereof.

6. The catalyst of claim 1 wherein said catalyst comprises from about 0.1 to about 80 weight percent of said silica zeolite, based on the total catalyst.

7. The catalyst of claim 1 wherein said silica zeolite has uniform pore diameters of above about 5 angstroms.

8. The catalyst of claim 1 wherein said silica zeolite has uniform pore diameters of about 6 angstroms, a mean refractive index, after calcination in air at 600° C. of $1.39 \pm 0.01$ and a specific gravity at 25° C. of $1.70 \pm 0.05$ g/cc.

9. The catalyst of claim 1 wherein said crystalline silica zeolite is silicalite.

* * * * *